July 21, 1931.　　　　B. DE MATTIA　　　　1,815,400
BALL MOLD PRESS
Filed July 24, 1929　　　4 Sheets-Sheet 4

INVENTOR.
Bartholo De Mattia
BY
ATTORNEYS

Patented July 21, 1931

1,815,400

UNITED STATES PATENT OFFICE

BARTHOLD DE MATTIA, OF PASSAIC, NEW JERSEY

BALL MOLD PRESS

Application filed July 24, 1929. Serial No. 380,576.

This invention relates to vulcanizing apparatus, and refers particularly to vulcanizing presses for use in the production of inflatable articles of rubber or rubberized fabric.

One of the objects of the invention is to provide a vulcanizing press having hingedly connected platens with a simplified power mechanism for opening and closing the press and with novel means for locking the press in closed position.

The improved press comprises a lower platen which is fixed on a suitable supporting frame or pedestal, and an upper platen which is hingedly connected to the rear edge of the lower platen and movable toward and away from the same. Steam jacketed mold sections are detachably secured to the platens, said mold sections having their opposing faces provided with suitably shaped cavities within which the articles to be vulcanized are adapted to be confined and subjected to heat and pressure. A transverse rock shaft is journaled on the upper platen, and has pivotally mounted on it a lever arm which extends rearwardly over said upper platen. This lever arm is, however, limited in its movement with reference to the upper platen and is adapted to swing the upper platen toward and away from the lower platen to close and open the press, and to rock said shaft in its lost motion. The opposite ends of the shaft are formed with eccentric portions upon which are suspended clamping members in the form of hooks which extend downwardly from the upper platen at opposite sides thereof. As the upper platen and its mold section reach their closed position in the operation of closing the press, these clamping members are swung into engagement with locking lugs which are secured to the fixed platen, whereby the two mold sections will be forcibly drawn together and held together. The rearward or free end of the lever arm is attached to the outer end of a piston rod whose other end carries a piston slidable within a pressure cylinder, said cylinder being pivoted at its lower end to the frame or base of the machine. Admission and exhaust of pressure fluid, such as compressed air, to and from the opposite ends of the pressure cylinder are manually controlled by a suitable valve conveniently placed adjacent to the front of the press, and means are also provided for quickly inflating the articles in the mold cavities.

The foregoing and other objects, features, and advantages of the invention will be clear from the following description in connection with the accompanying drawings, wherein one form of the invention has been shown by way of illustration, and wherein Fig. 1 is a perspective view of the improved press made in accordance with the invention;

Fig. 5 is a fragmentary side elevation showing the clamping members in their undocking position with the press closed.

Figure 1:
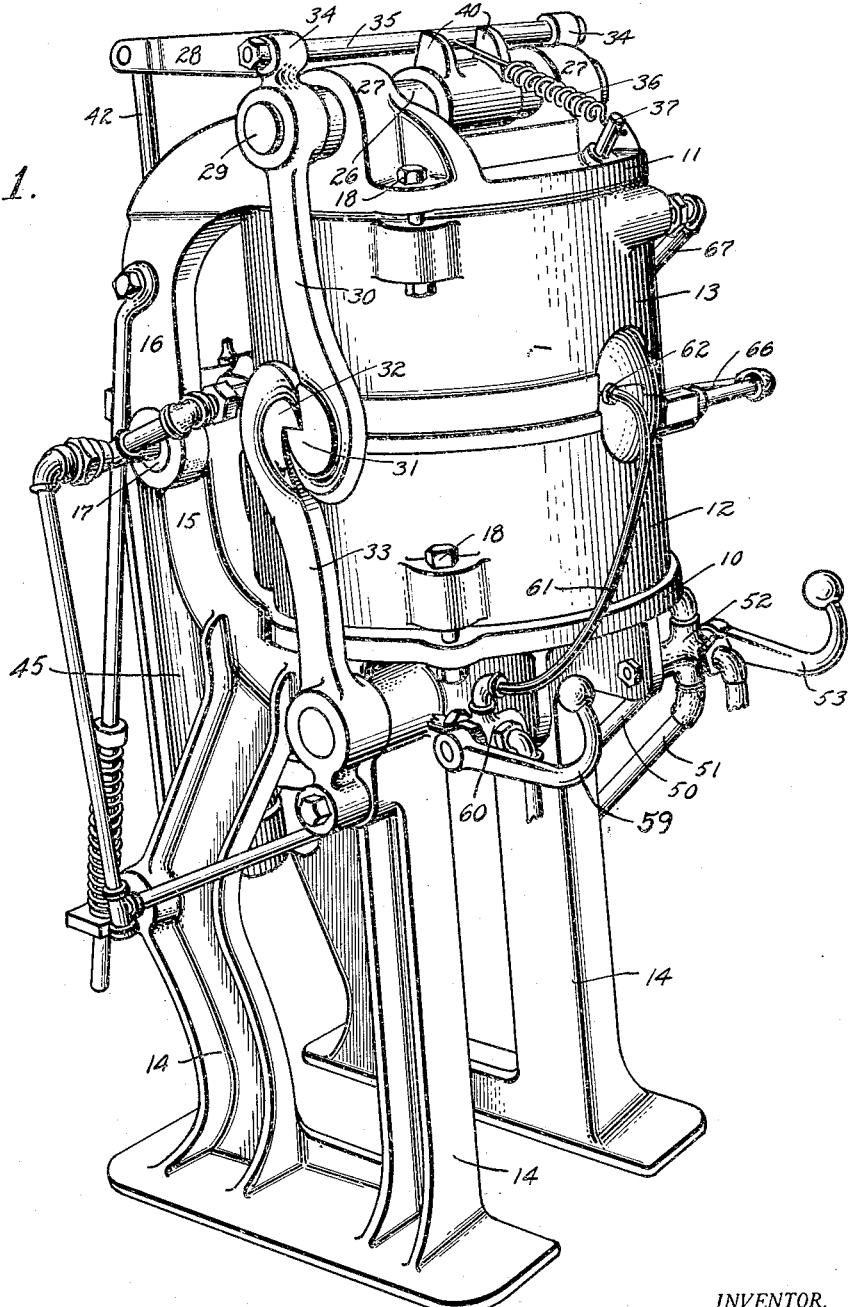

By reference to the drawings in detail, it will be seen that the improved vulcanizing press comprises a fixed lower platen 10 and a movable upper platen 11, said platens constituting supports for opposing annular mold sections 12 and 13 respectively. The lower platen 10 is preferably cast integral with a suitable pedestal or supporting legs 14, and is inclined slightly from the horizontal, in a rearward direction. Hinge knuckles or arms 15, spaced from each other, extend upwardly from the rear edge of the fixed platen 10, while similarly formed hinge knuckles or arms 16 extend downwardly from the movable platen 11. The ends of said arms 15 and 16 are provided with alined openings for the accommodation of a hinge pin 17, and by virtue of this connection the movable platen 11 and its mold section 13 may be swung toward and away from the fixed platen 10 and its mold section 12.

In order that the press may be employed for the manufacture of different sizes and kinds of articles, the mold sections 12 and 13 are detachably secured to their respective platens by clamping bolts 18 and nuts 19. Thus a plurality of different mold sections may be interchangeably mounted for use in the press. The specific mold sections shown in the drawings are adapted to vulcanize large exercise balls, but of course, the invention is not restricted to such manufacture.

The opposing faces of the mold sections 12 and 13 are provided with semi-spherical recesses which, when the mold is closed, define an enclosed vulcanizing cavity 20 for confining the article to be cured. These recesses are surrounded by steam jackets 21 and 22 through which steam or other heating fluid is circulated to provide the necessary vulcanizing heat, while the article is inflated to provide the desired pressure. The piping connections for said heating and pressure fluid will be more fully described hereinafter. To facilitate accurate registration of the two mold sections when the press is closed, the mold section 13 is formed with a counterbore 23 around its mold recess, for the reception of an annular flange or lip 24 of the mold section 12, the wall of said counterbore and the corresponding portion of said flange or lip being slightly beveled so that they may tightly seat together.

A rock shaft 26 extends transversely over the movable platen 11, being rotatably held in spaced bearings 27 between which an actuating lever 28 is keyed on or otherwise secured to the shaft. The opposite ends of the shaft 26, outside of the bearings 27, are formed with eccentric portions 29, the axes of which are offset from the axis of the shaft, and a pair of depending clamping members 30 is rotatably held by said eccentric portions. These clamping members 30 extend downwardly on opposite sides of the mold section 13 and have the lower ends formed as hooks 31 which, when the mold is closed, are adapted to engage hook-shaped ends 32 of locking lugs 33 which are fixed at the sides of the fixed platen 10 and its mold section 12. The upper ends 34 of the clamping members 30 extend above the eccentric portions 29 and are rigidly connected together by a cross-bar 35, whereby the two clamping members may be rocked in unison. One end of a tension spring 36 is secured to the central portion of the cross-bar 35, while its other end is anchored, as at 37, at the front of the swinging platen 11, whereby the clamping members will be normally urged to their locking positions.

The upper platen 11 has, at its rear edge, an abutment 38 against which the lever 28 is adapted to engage in its downward movement, and during such movement of the lever with reference to the platen, the clamping members 30 are moved to their unlocking position by virtue of the engagement of a pair of lugs 40 on the lever hub against the forward side of the cross-bar 35. The rear end of the lever arm 28 is bifurcated and has a pivotal connection at 41 with the upper end of a piston rod 42 which slides through a stuffing box 43 in the upper head 44 of a pressure cylinder 45 at the rear of the press. The lower head 46 of the cylinder is pivoted at 47 to the legs 14, and slidable within the cylinder is a piston 48, which is secured to the inner or lower end of the rod 42. Thus, as the piston is caused to move downwardly in the cylinder, it first unlocks the mold, and after the lever 28 has engaged the abutment 38, it causes the movable platen 11 and its associated parts to swing upwardly about the axis of the hinge pin 17.

Admission and exhaust of pressure fluid, such as compressed air, alternately to and from the upper and lower ends of the cylinder, is effected through pipes or tubes 50 and 51 under the control of a manually operable valve 52 which is mounted below the fixed platen 10 and adjacent the front thereof. This valve 52 has been shown as of a conventional four-way plug type, wherein a ported plug is rotatable through the medium of a handle 53 to give the proper communications between the respective pipes 50, 51, and a fluid supply branch 54 and an exhaust branch 55. Obviously, other specific types of control valves may be employed in place of that illustrated in the drawings. Portions of the pipes 50 and 51 are formed of flexible tubing 56 and 57 to allow for the rocking of the cylinder 45 in the opening and closing of the press.

Figure 2:
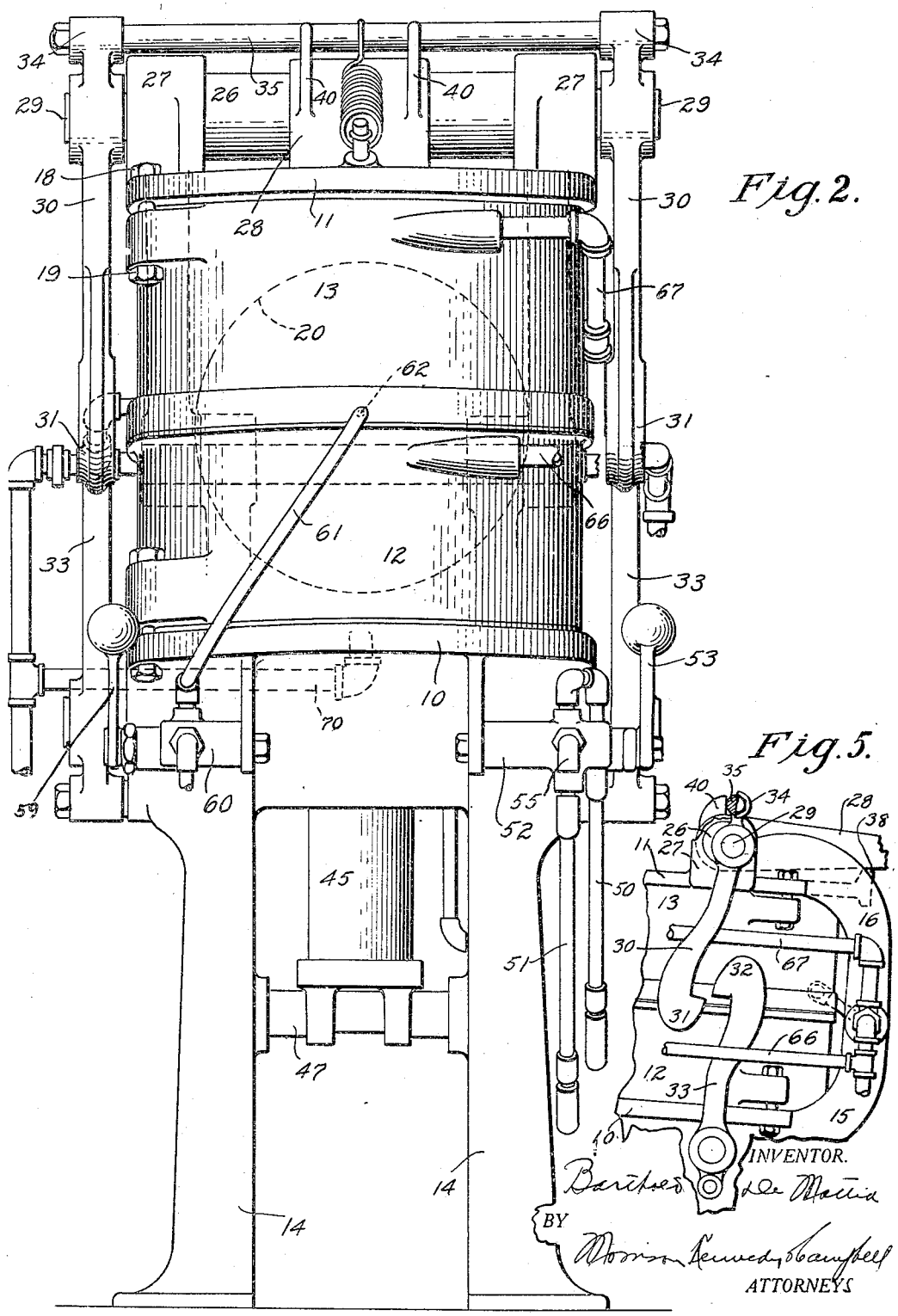
Fig. 2 is a front view thereof.

At the other side of the press (Fig. 2) and below the platen 11, there is a two-way valve 60, having an operating handle 59, by means of which a suitable pressure fluid may be supplied to and exhausted from the article to be vulcanized, through a flexible tube 61. The article being operated upon has, of course, an inflation valve stem of any ordinary or preferred form, which, when the press is closed, extends through a suitable opening 62 between the mold sections 12 and 13, and to which the tube 61 can be easily connected and disconnected. By mounting the valves 52 and 60 adjacent the front of the fixed platen 10, with their respective handles 53 and 59 extending forwardly at opposite sides of the vertical center of the press, the operator can very conveniently manipulate the valves with a minimum amount of effort.

As has previously been stated, the mold sections 12 and 13 are heated by the continuous circulation of steam or other heating fluid through the jackets 21 and 22. For this purpose, a steam supply pipe 65 is mounted at the rear of the press and formed with branches 66 and 67 which respectively communicate with the upper portions of the jackets 21 and 22. The branch 67 is connected to the pipe 65 by means of a swivel joint 68 concentric with the hinge pin 17. Similarly, at the other side of the machine is a drain pipe 69, having branches 70 and 71 which communicate with the bottoms of the jackets 21 and 22, the branch 71 also having a swivel joint concentric with the axis of the hinge pin 17.

Figure 3:
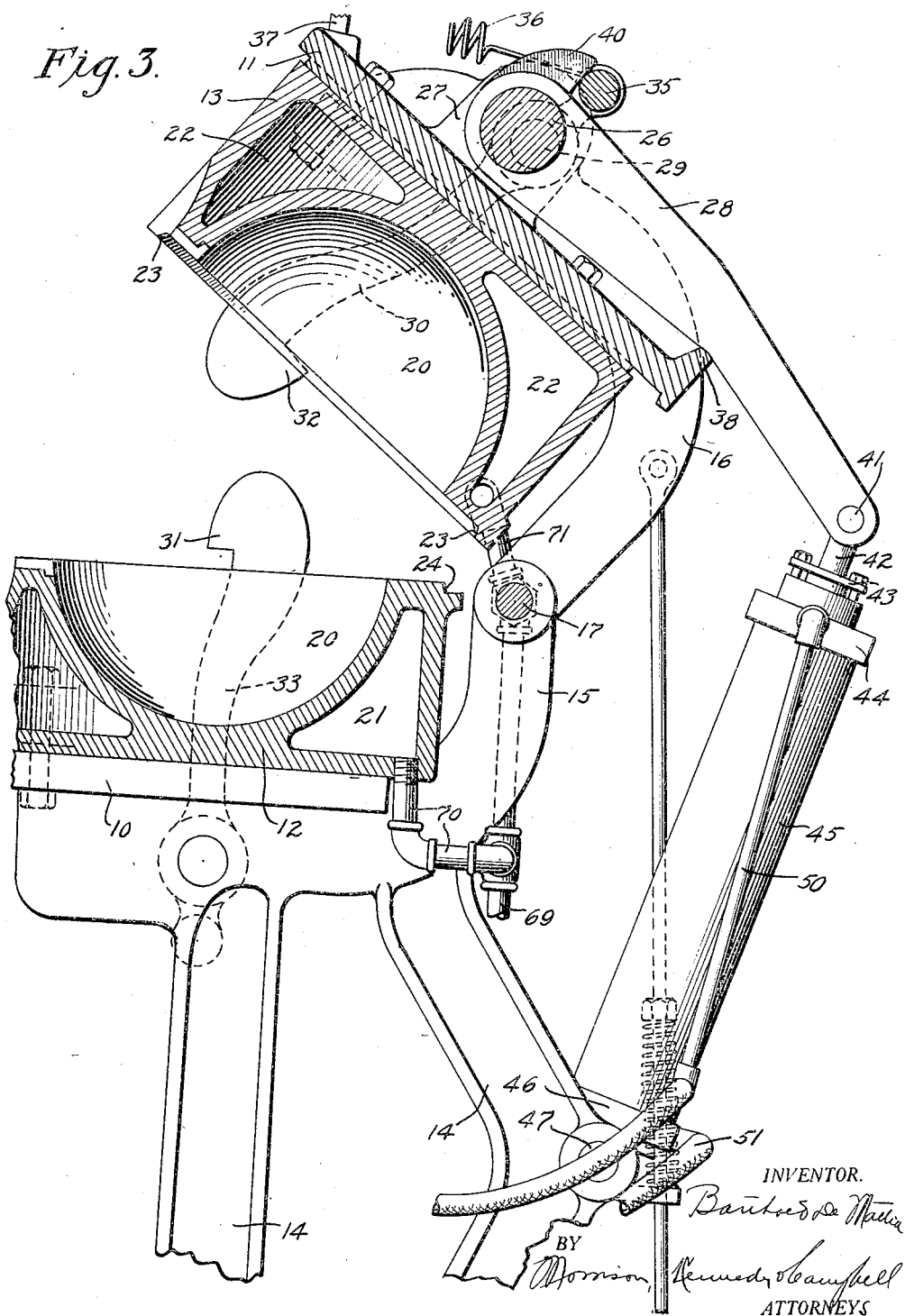
Fig. 3 is a vertical sectional view approximately on line 3—3 of Fig. 2, but showing the press opened.
Figure 4:
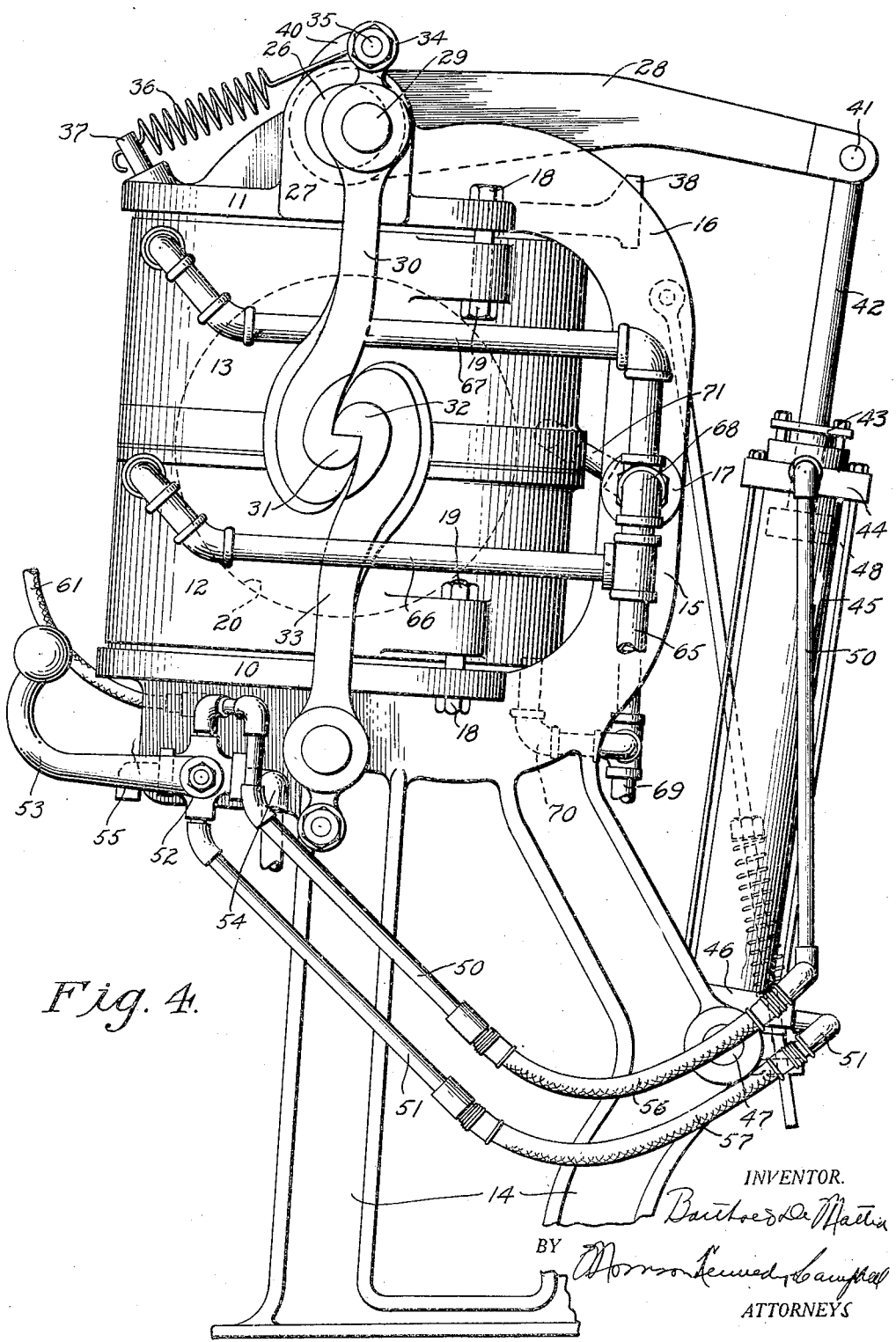
Fig. 4 is a side elevation of the press in locked condition.

Assuming now that the press is open as shown in Fig. 3 and is to be used, the steam supply is first turned on to uniformly heat the walls of the mold cavity 20. The unvulcanized ball is then placed in the cavity 20 and its valve stem (not shown) connected with the flexible inflation tube 61. The handle 53 is then moved to the position shown in Fig. 4, whereupon compressed air will be supplied through the valve 52 and pipe 51 to the lower end of the cylinder 45, forcing the piston 48 upwardly. As the piston rises, the upper platen 11 and mold section 13 move downwardly to their closed position, and as this takes place, the operator will manipulate the handle of valve 60 to supply inflating fluid to the article confined in the cavity 20. As the opposing faces of the mold sections come substantially into contact, the lever 28 will continue to swing upwardly from the platen 11 rocking the shaft 26, whereupon the spring 36 swings the clamping members 30 toward the lugs 33 to engage the hooks 31 and 32, and the eccentric portions 29 of said shaft will swing upwardly to effect a powerful clamping action.

After the article thus confined within the cavity 20 has been subjected to the vulcanizing heat and pressure for a sufficient length of time, the press may be quickly opened and the article deflated by the reverse movements of the handles of valves 52 and 60. In the operation of openings the press, the lost motion of the lever 28 provides for the unlocking of the press prior to the commencement of the upward swing of the platen 11.

From the foregoing, it will be clear that an improved vulcanizing press has been provided in which the construction is extremely simple, and in which a single power means is used for both the closing and locking as well as for the unlocking and opening. Obviously modifications may be resorted to in the details of construction and arrangement of parts, and the right is herein reserved to make such changes as fall within the scope of the appended claims without departing from the spirit of the invention.

Having thus described my invention, what I claim is:

1. A vulcanizing press comprising a pair of opposed platens hingedly connected together, a lever for moving one of the platens toward and away from the other, said lever having a limited lost motion with reference to the movable platen, locking lugs on the fixed platen at opposite sides thereof, and clamping members pivoted at the opposite sides of the movable platen and adapted to be swung into and out of locking engagement with said lugs by the lost motion of said lever.

2. A vulcanizing press comprising a pair of opposed platens hingedly connected together, and locking means comprising clamping members pivoted at the opposite sides of one of the platens, locking lugs fixed to the corresponding sides of the other platen and adapted to be engaged by the free ends of said clamping members, and means including eccentrics for simultaneously swinging both clamping members into and out of locking engagement with said lugs.

3. A vulcanizing press comprising a pair of opposed platens hingedly connected together, power mechanism including a lever for moving one of the platens toward and away from the other, said lever being capable of limited lost motion with reference to the movable platen, locking lugs secured to the fixed platen at opposite sides thereof, and clamping members pivoted at the opposite sides of the movable platen and adapted to be swung into and out of locking engagement with said lugs by the lost motion of said lever.

4. A vulcanizing press comprising a pair of opposed platens hingedly connected together, mechanism for swinging one of said platens with reference to the other, said mechanism including an arm extending outwardly from the swinging platen and capable of limited lost motion with reference thereto, and fluid-pressure means for actuating said arm, locking lugs fixed at the opposite sides of the fixed platen, and clamping members suspended at opposite sides of the swinging platen, said clamping members being adapted to be swung into and out of locking engagement with said lugs by the lost motion of said arm.

5. A vulcanizing press comprising a lower fixed platen and an upper movable platen hingedly connected to the rear edge thereof, power mechanism including a pressure cylinder for swinging the movable platen upwardly from the fixed platen to open the press, locking lugs fixed at the opposite sides of the lower fixed platen, clamping members pivoted at the sides of the upper movable platen and adapted to engage and disengage said locking lugs, and means including eccentrics for actuating said clamping members by said power mechanism.

6. A vulcanizing press comprising a frame, a lower fixed platen on the frame, an upper movable platen hingedly connected at the rear edge thereof, locking lugs fixed to the opposite sides of the fixed platen, a transverse rock shaft journaled on the movable platen, said shaft having eccentric portions on its ends, a lever pivoted on said shaft and extending rearwardly therefrom, said lever having limited lost motion to rock the shaft, clamping hooks depending from said eccentric portions of the shaft to engage and disengage said locking lugs, and power mechanism for operating on said lever to open and close the press, said mechanism including a pressure cylinder pivoted at its lower end to said frame, a piston slidable in said cylinder, and a piston rod secured to the piston and extending through the upper end of the cylinder, the outer end of said piston rod being attached to the rearward end of said lever.

7. A vulcanizing press comprising a pair of opposed platens hinged with reference to each other, means including a lever operative to effect relative movement between said platens to open and close the press, a plurality of locking lugs fixed on one of the platens, a plurality of locking members pivotally mounted on the other platen and adapted to be swung into and out of locking engagement with said lugs, and a lost motion connection between said lever and said locking members.

In testimony whereof, this specification has been duly signed by:

BARTHOLD DE MATTIA.